United States Patent

Brune et al.

[15] 3,665,393

[45] May 23, 1972

[54] CORRECTING ERRORS IN TRANSMITTED BINARY DATA

[72] Inventors: Werner Brune, Darmstadt; Gunter Schwartz, Selignestadt; Ernst Hermann Dull, Darmstadt-Eberstadt; Edgar Polly, Seligenstadt, all of Germany

[73] Assignee: Licentia Patent-Verwaltungs-G.m.b.H., Frankfurt, Germany

[22] Filed: June 8, 1970

[21] Appl. No.: 44,254

[30] Foreign Application Priority Data

June 6, 1969 Germany........................P 19 28 673.8
May 23, 1970 Germany........................P 20 25 340.1

[52] U.S. Cl......................................................340/146.1BA
[51] Int. Cl..........................................................G08c 25/00
[58] Field of Search....................340/146.1, 174.1; 235/153; 178/23.1; 325/41

[56] References Cited

UNITED STATES PATENTS

| | | | |
|---|---|---|---|
| 2,897,480 | 7/1959 | Kumagai | 340/146.1 X |
| 3,174,133 | 3/1965 | Kunzman, Jr. et al. | 340/146.1 X |
| 3,421,148 | 1/1969 | Howells et al. | 340/146.1 X |
| 3,449,718 | 6/1969 | Woo | 340/146.1 |

*Primary Examiner*—Charles E. Atkinson
*Attorney*—Spencer & Kaye

[57] ABSTRACT

Single errors occurring in parallel transmitted binary data words, due to one path of the transmission channel having a fault which causes it to invariably transmit one binary value or the other, are corrected by transmitting the complement of each word found to contain such error and inverting the transmitted complement word at the output end of the path.

18 Claims, 9 Drawing Figures

Inventors:
Werner Brune, Günter Schwartz,
Ernst Hermann Düll, Edgar Polly
By: Spencer & Kaye
Attorneys Inventors:
Werner Brune, Günter Schwartz,
Ernst Hermann Düll, Edgar Polly
By: Spencer & Kaye
Attorneys Inventors:
Werner Brune, Günter Schwartz,
Ernst Hermann Düll, Edgar Polly
By: Spencer & Kaye
Attorneys Inventors:
Werner Brune, Günter Schwartz,
Ernst Hermann Düll, Edgar Polly
By: Spencer & Kaye
Attorneys

CORRECTING ERRORS IN TRANSMITTED BINARY DATA

BACKGROUND OF THE INVENTION

The present invention relates to methods and circuit arrangements for the correction of errors occurring in information represented by binary signals which are transmitted over a transmission channel composed of a plurality of parallel transmission paths, in which a checking for errors occurs at the output of the transmission channel and the error correction is then accomplished if an error has been detected.

Data processing systems are being manufactured with ever larger capacity memories, and the larger the memory, the greater the probability of one memory element becoming defective. For economic reasons it is impossible, however, not to use a particularly large memory just because a single or several individual memory elements are defective. If the memory were taken out of operation, the usefulness of the data processing system would be at least reduced. To avoid such far-reaching effects several proposals have already been made.

For example, it is known to provide a memory with a reading circuit in whose storage locations words are stored which contain at least one error testing bit. There is also provided an auxiliary memory containing the addresses of those memory locations which contain an error. The memory can be used despite the faulty memory location by associating the readout of a faulty memory location with the addressing of a memory location in the auxiliary memory which is associated with the first location and storing the address of the faulty bit in this memory location of the auxiliary memory. The bit of the readout word which the auxiliary memory indicated to be faulty is then changed when the error test indicates an error. The drawback of this known reading circuit is that it is necessary to provide an auxiliary memory with the corresponding additional control, writing and reading circuits to eliminate the errors caused by the faulty memory locations.

A circuit arrangement for detecting and correcting errors in binary coded data blocks has also become known. In this known circuit arrangement the basic assumption is that it is necessary, in order to correct the errors in the data, not only to determine the presence of an error but also to locate this error. After locating the faulty bit, the correction is made by an inversion of the faulty bit. The location of an error and the subsequent inversion of the faulty bit requires a substantial amount of circuitry.

SUMMARY OF THE INVENTION

It is an object of the present invention to provide simple methods and circuit arrangements for the correction of errors in data where the location of the error is no longer necessary.

This is accomplished according to the present invention by inverting the information after the detection of an error and transmitting the inverted information over the transmission channel and then again inverting it.

The solution according to the present invention is based on the realization that it is most often only one bit in a data word which is faulty. Errors involving a plurality of faulty bits are comparatively rare. The cause of such errors is, for example, the interruption of a line, the grounding of a line, or a faulty core in a memory matrix. Since, moreover, in the present case each bit is transmitted over an individual associated transmission path, the presence of such an error at the output of the respective transmission path will result in the signal always being either 0 or L (L being employed herein to represent a binary "1") depending on the cause of the error. Thus, there will not be any dependence on the associated input signal.

It it is assumed that the input signal for this bit assumes the values 0 and L with the same probability, the error will not be noticeable in half of the data whereas in the other half the bit will be incorrect. The presence of an error in the latter cases is detected in a known manner by an error recognition device, for example by a parity testing.

In order to correct the error according to the present invention, it is no longer necessary to locate the error and to invert the bit in question. The location of the error is advantageously left automatically to the error-containing transmission channel in that the data is again transmitted through the channel after having first been inverted. The inverted data is then transmitted correctly since the output associated with the error-containing location always emits the same signal 0 or L. A second inversion will then produce the error-free information.

It is thus presupposed during this correction procedure that the error continues to exist at least during the correction procedure.

One advantage of the method according to the present invention is that hardly any additional devices are required to carry it out. It is only necessary to allow for a longer transmission time which is a result of the correction process. However, known arrangements also require additional time for the location of the error in faulty data and the inversion of the faulty bit.

A further advantage is that the method according to the present invention can be employed even when the data is provided with only one additional test bit. Errors which occur only during operation are also detected and corrected. Although the detection of errors and their correction is definitely assured only for single errors, this does not represent a substantial practical limitation in the value of the invention since single errors occur much more often than multiple errors.

In a suitable embodiment of the method of the present invention, the data is available at the input of the transmission channel at least until the error testing at the output of the transmission channel is completed and an error signal has possibly been sent back. With the occurrence of an error this information is inverted, transmitted and then again inverted at the output of the transmission channel. This type of procedure eliminates in a favorable manner the retransmission of error-containing data to the input of the transmission channel.

The method according to the present invention can be employed to particular advantage when the transmission channel is a memory. In this memory the readout information is available, after receipt of the readout instruction, in an information register. It is tested for the presence of an error. The further performance of the method is advisably based on considerations of the coaction of the memory with subsequently connected devices, particularly with a computer.

In a preferred embodiment, the readout information is still available at the same location in the memory when the error testing takes place, or is at least completed. In the case of a destructive readout of the data, the data is immediately rewritten by the information register. With the presence of an error, however, the data is not released to the subsequently connected devices but is rather subjected to a double readout/rewrite cycle (destructive readout) or a double readout, erase/write-in cycle (nondestructive readout), in which the information is inverted each time after the readout. The information produced in the information register after the last readout is released. This embodiment advantageously avoids unnecessary prolongation of the cycle period when there are no errors. The cycle period is increased only when an error is present. The access time, i.e., the time after which the requested information is released to the subsequently connected devices, is also short when there are no errors and is lengthened only by the time required for the error checking. This embodiment is therefore used most of all where the memory cooperates with a fast-acting computer unit.

In another advantageous embodiment, where the transmission channel is a memory, there is no release when an error is present but rather the information contained in the information register is inverted. The inverted information is written into the same location of the memory, is then again read out and is released after again being inverted. In this embodiment there results, in the case where there is no error, the same access time as in the above-descirbed embodiment. However, the cycle time is somewhat longer in the case where there are no errors. With the presence of an error, however, the access time is increased by a lesser amount than in the above-described embodiment because the information circulates only once through the information register — memory block — information register circuit. The accomplishment of the method with only one cycle is therefore preferred if a relatively short access time is desired even when errors are present.

In the above-described methods it is assumed that the error value can safely be interpreted consistently as a binary "0" or "L". This can be assumed in many cases, e.g., line interruptions, ground connection without contact resistance. However, errors are also possible in which the error value lies in the vicinity of a discrimination thereshold which associates it with the values "0" or "L". Fluctuations in this value about the discrimination threshold may then have an adverse influence during the correction process.

The effects of such fluctuations can be avoided, however, in that an advantageous embodiment of the proposed method lowers the discrimination threshold during the error correction process if the transmitted signal was above the discrimination threshold during the error recognition process, or raises the threshold if the transmitted signal was below the discrimination threshold during the error recognition process.

An adverse influence exerted by the above-mentioned fluctuations can also be avoided if, instead of the discrimination threshold, the parameter producing the signal to be transmitted is increased if the transmitted signal was above the discrimination threshold during the error recognition process or is lowered if the transmitted signal lay below the discrimination threshold during the error recognition process. For example, a change of the discrimination voltage threshold in reading amplifiers of a core memory can be replaced by an appropriate change in the excitation currents of magnetic matrix memories or by an appropriate change in the light intensity of optical memories.

DESCRIPTION OF THE PREFERRED EMBODIMENTS

Figures 1, 2:
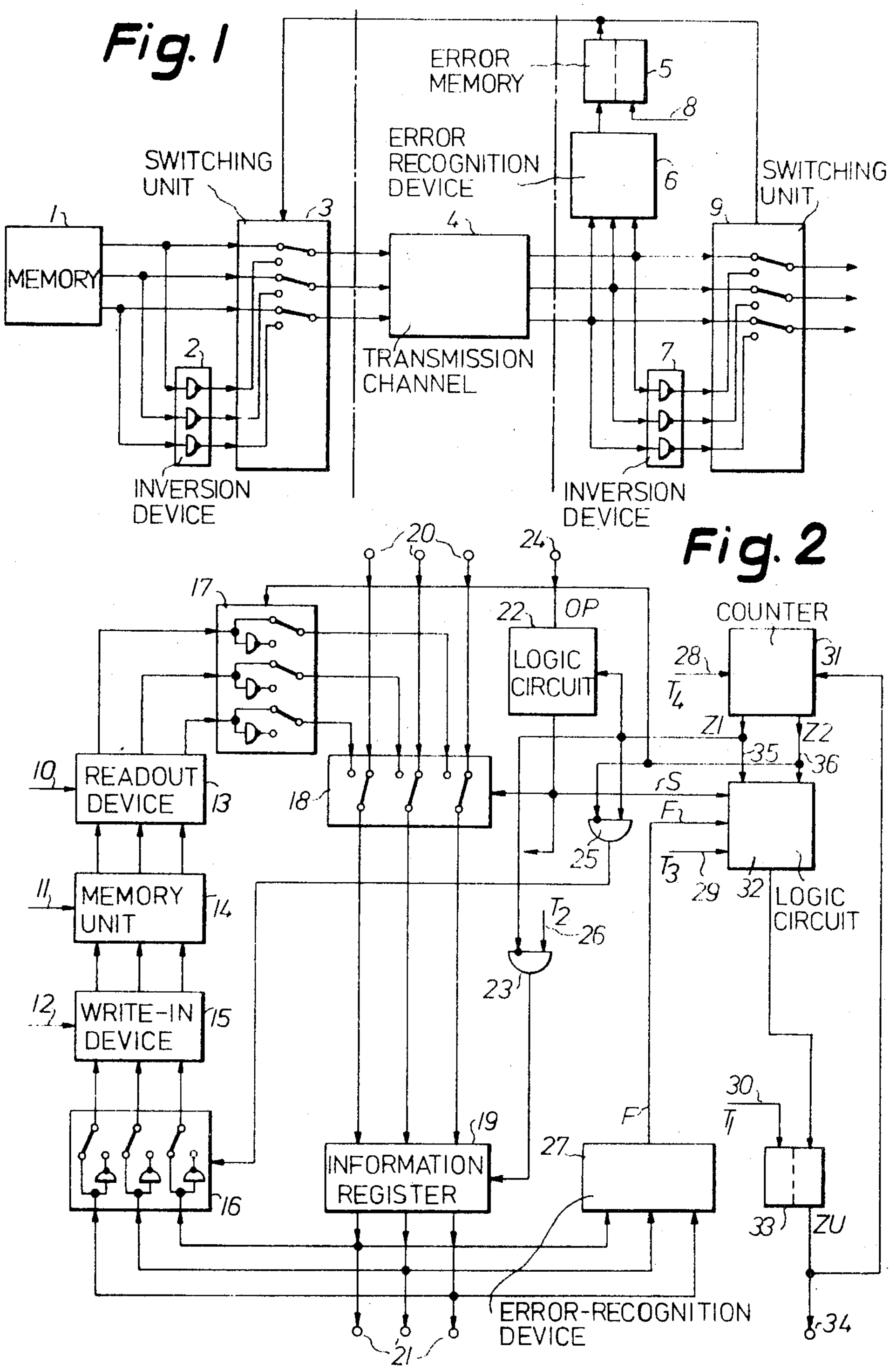
FIG. 1 is a schematic diagram of a circuit arrangement in which the input and output of a transmission channel may be spaced far apart.
FIG. 2 is a diagram of a circuit arrangement having a memory for non-destructive reading and one-time circulation of the information when an error is present.

The circuit arrangement shown in FIG. 1 includes a transmission channel 4 whose input and output may be spaced far apart. The transmission channel 4 has a plurality of parallel transmission paths so that each bit of a data word is transmitted over a separate transmission path. Three transmission paths are schematically indicated. To simplify the description, however, reference will be made hereinbelow only to the transmission channel and its input and output without particularly mentioning the individual transmission paths.

The input of the transmission channel 4 is connected with the output of a memory 1 via a first switch unit 3. An inversion device 2 is further provided between the output of memory 1 and the first switch 3. While, for explanatory purposes it is shown separately in FIG. 1, in practice the inversion device 2 may be advisably combined with memory 1 in such a manner that a memory 1 having complemented outputs for each bit is provided. The switch is then connected, for each bit, with the positive and the complement output of the memory.

The output of the transmission channel 4 is connected directly with one input of a second switch 9 and, via a further inversion device 7, with a further input of switch 9. The output is also connected with the input of an error recognition device 6 which can be of any known type and whose structure depends on the nature of the test code associated with each data word. The error recognition device 6 is connected, via a memory 5, which could be a flip-flop, having a control input 8, with a signal input of the first switch 3 and a signal input of the second switch 9. The connection with the signal input of the first switch 3 can be made over a separate transmission path. However, the available transmission paths of transmission channel 4 can also be utilized for this connection. In this case auxiliary devices known from the remote control art must be provided. While, switches 3 and 9 are illustrated as mechanical devices, it will be appreciated that they are preferably electronic units.

The arrangement shown in FIG. 1 operates as follows:

Information words represented by a plurality of bits and at least one test bit which are to be transmitted in a parallel manner are fed into memory 1 and subsequently delivered to the input of transmission channel 4, via switch 3 which is in its normal state as shown in FIG. 1. The information is transmitted by transmission channel 4 at the output of which the error recognition device 6 determines whether the transmission occurred with or without errors. When there are no errors, the information can be taken off at the output of the second switch 9. The information still present in memory 1 is then erased or new information to be transmitted is written into the memory.

If, however, checking of the information results in the determination of the presence of an error due to a fault in one path of the channel 4, memory 5 is enabled by the output signal of the error recognition device 6 and the resulting output signal from memory 5 operates switches 3 and 9. Thereafter the complement of the information previously transmitted from memory 1 is transmitted, the switching of switch 3 having connected the input of transmission channel 4 with the output of the inversion device 2. The data is again inverted at the output of transmission channel 4 since after switching the output of the transmission channel is connected with the input of inversion device 7. After completion of this correction by double inversion and taking the information from the output of switch 9, memory 5 is reset by the application of a suitable control pulse to input 8. Further transmissions of data words can then follow over transmission channel 4 as described.

The double inversion eliminates the adverse influences, in one transmission path of the transmission channel 4, of faults which lead to a continuously present 0 or L signal at the output of the respective transmission path, without any preliminary location of the fault. In other words, if error recognition device 6 has detected an error, such an error does not lead to a falsification of the inverted and subsequently transmitted information. Reinversion then produces the correct information.

The above-mentioned faults appear most often as single errors, for example, as a result of an interruption in the line or a short to ground in only one transmission path of the transmission channel. Adverse influences of such single errors can be eliminated in a simple manner by the arrangement and method of the present invention. A further advantage is that the transmitted information need only lead to the recognition of the presence of an error. A single test bit is thus sufficient to permit recognition and correction of such an error. Even temporary errors, e.g., as a result of a loose contact, can be corrected if the error remains present during the time required for the correction.

The circuit arrangement shown in FIG. 2 includes a memory arranged for nondestructive readout and controlled by a clock pulse signal, and in which, in the case of the presence of an error, the information circulates only once through the circuit consisting substantially of a memory unit 14 and an information register 19. The memory unit 14 is connected in a known manner with a readout device 13 and a write-in device 15. The readout device 13, the memory unit 14 and the write-in device 15 are each provided in a known manner with control inputs 10, 11 and 12.

The outputs of the information register 19 are connected: with the information outputs 21; with the inputs of memory unit 14 via a first switchable inversion device 16 and write-in device 15; and with the inputs of an error recognition device 27 which may, for example, be a known parity checking device. The outputs of the memory unit 14 are connected with the inputs of the information register 19 via a second switchable inversion device 17 and a switch 18.

The use of mechanical symbols for the switching members in switch 18 and in the inversion devices 16 and 17 is only for explanatory purposes. In practice the switches are formed of semiconductor elements, e.g., transistors, particularly in view of high switching speeds involved.

The above-described devices are connected together by a plurality of transmission paths so that there is one transmission path for each bit of a data word. In FIGS. 1–4 this is schematically represented by three parallel transmission paths.

The output of error recognition device 27 is connected to the input of a logic circuit 32 controlled by a clock pulse $T_3$, and the output of circuit 32 is connected to a memory 33 which can be erased by a clock pulse $T_1$. The inputs for clock pulse signals $T_3$ and $T_1$ are marked 29 and 30, respectively. The output of memory 33, which can be a flip-flop, is connected to a release output 34 and to an input of a counter 31. Counter 31 is controlled via a second input 28 by a clock pulse $T_4$ and is provided with a first output 35 and a second output 36. Both outputs 35 and 36 are connected to respective inputs of logic circuit 32 and to the inputs of a first ANDNOT member 25, signal Z2 from counter output 36 being connected to the negated input of member 25. The output of the member 25 is connected to the control input of the first inversion device 16.

The second output 36 of counter 31 is also connected to the control input of the second inversion device 17. The first output 35 of counter 31 is also connected via the negated input of a second ANDNOT member 23 having its direct input 26 connected to receive a clock pulse $T_2$, to a control input of information register 19. Counter output 35 is also connected directly with an input of a further logic circuit 22.

A signal OP controlling the mode of operation of the memory is applied, via input 24, to the logic circuit 22. One output thereof is connected to the control input of switch 18 and to one input of logic circuit 32. Moreover, the signal emitted by the output of logic circuit 22 also acts on a control mechanism which, for reasons of clarity, is not shown in FIG. 2 and which generates readout pulses applied to input 10, write-in pulses applied to input 12 and the clock pulses $T_1$, $T_2$, $T_3$ and $T_4$ which act during each readout or write-in cycle.

Figure 2A:
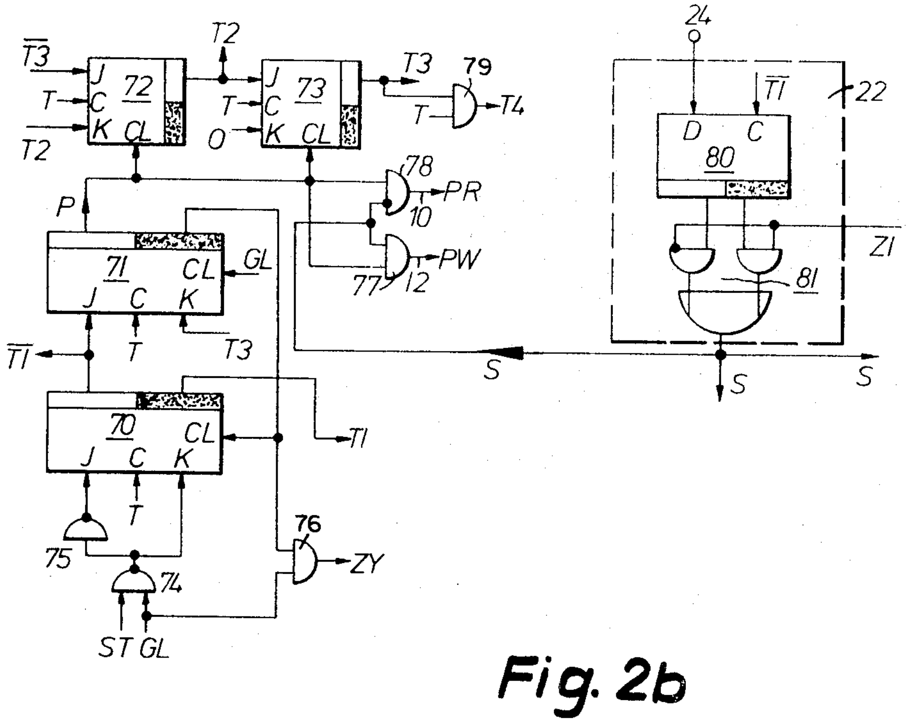
FIG. 2*a* is a diagram of a circuit arrangement for producing the clock pulses and the read-in and readout pulses used in the circuit arrangement shown in FIG. 2.
Figure 2B:
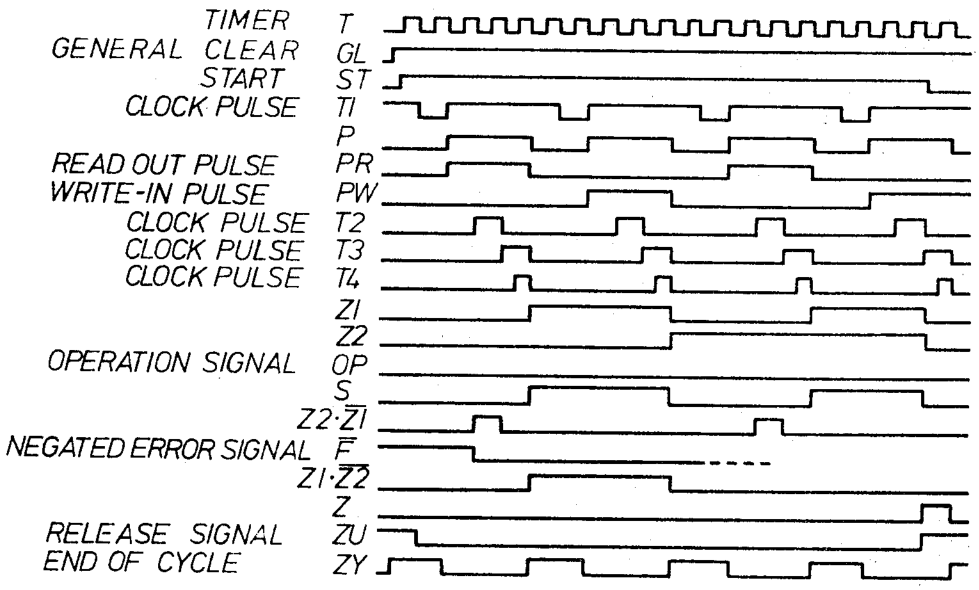
FIG. 2*b* is a timing chart of pulses as they appear at different points of the circuit arrangements shown in FIG. 2 and in FIG. 2*a*.

The circuit arrangement of this control mechanism is shown in FIG. 2a. It includes four J–K master-slave flip-flops 70, 71, 72, and 73 with clear inputs CL, e.g., TYPE SN 7476 N from TEXAS INSTRUMENTS. Each input C of the flip-flops 70, 71, 72, 73 is connected with an output of an oscillator (not shown; FIG. 2*b*: TIMER). The input J of the flip-flop 70 is connected via a NOT member 75 to the output of an AND member 74 having two inputs ST and GL. The output of AND member 74 is also directly connected with input K of flip-flop 70. A signal "general clear" controlling the initial conditions after the supply voltage has been switched on is applied at input GL. This input is also connected with an input of an AND member 76 and the input CL (clear) of flip-flop 71. At the positive output of flip-flop 70 appears the clock pulse $\overline{T1}$, at the complemented output the clock pulse T1. The positive output is connected with the input J of flip-flop 71.

The input K of flip-flop 71 is connected with the positive output of flip-flop 73 (connection not shown). The complemented output of flip-flop 71 is connected with the clear input CL of flip-flop 70 and with the second input of AND member 76. At the output of AND-member 76 appears the signal ZY (end of cycle).

The positive output of flip-flop 71 is connected: with the clear input of flip-flop 72; with the clear input of flip-flop 73; with an input of AND-member 78; and with an input of AND-member 77. At this output appears a pulse P from which the read-out pulse PR and the write-in pulse PW are derived.

The output of the flip-flop 72 is connected with its own input K (connection not shown) and with the input J of flip-flop 73. The input J of flip-flop 72 is connected with the complemented output of flip-flop 73 (connection not shown). At the positive output of flip-flop 72 appears the clock pulse T2.

A signal "0" is applied at input K of flip-flop 73. At the positive output of flip-flop 73 appears the clock pulse T3. This output is connected with an input of an AND-member 79. At the second input of AND-member 79 the clock pulse T is applied. At its output a the clock pulse T4 appears.

The output of the logic circuit 22 is connected with the second input of AND-member 77 and with the negated input of AND-member 78. At the output of AND-member 78 appears the readout pulse PR. This output is connected with the input 10 of the readout device 13 (FIG. 2). At the output of AND-member 77 appears the write-in pulse PW. This output is connected with the input 12 of the write-in device 15 (FIG. 2).

The logic circuit 22 effects, when an error is present in the information readout of memory unit 14 and present in information register 19, a temporary conversion of the operation signal "readout" delivered by an external device, e.g., a computer, to the operation signal "write-in" during the correction process taking place. This conversion is actuated by a signal Z1 temporarily generated during the correction process by counter 31 and present at output 35. Thus the operation signal OP at input 24 is not converted by circuit 22 if signal Z1 is not present. If the output signal of logic circuit 22 is designated S, there results the following logic relationship for circuit 22:

$$S = (OP \cdot \overline{Z1}) + (\overline{OP} \cdot Z1)$$

An exemplary embodiment of a circuit arrangement of the logic circuit 22 is shown in FIG. 2*a*. It consists of a D-type edge triggered flip-flop 80, e.g., TYPE SN 7474 N of Texas Instruments, and an exclusive OR-member 81. The D-input of flip-flop 80 is connected with input 24. At the clock input C the clock pulse $\overline{T}$ is applied. The positive output and the complement output of flip-flop 80 are connected with an input of the first and the second AND-members of exclusive OR-member 81, respectively. At the second input of these AND-members the signal Z or the signal $\overline{Z}$ is applied (as shown). At the output of exclusive OR-member 81 the signal S appears. It is applied to the AND-members 77, 78 (FIG. 2*a*) and to the logic circuit 32 and the switch 18 (FIG. 2).

In FIG. 2*b* a timing chart of pulses is shown, which appear at different points of the circuit arrangements shown in FIGS. 2 and 2*a* during the correcting process taking place.

The appearance of signal Z1 is determined by the coaction of logic circuit 32 with counter 31.

Counter 31 has two stages. It is reset to zero by a release signal ZU emitted by error memory 33 and counts up the clock pulse signals $T_4$ appearing at input 28. The signals Z1 and Z2 can appear only when the release signal ZU does not appear. When the release signal ZU does not appear, Z1 appears after the first clock pulse $T_4$, after the second clock pulse $T_4$, Z2 appears and Z1 disappears, and after the third clock pulse $T_4$, Z1 and Z2 are present in the final position of counter 31.

Logic circuit 32, as well as the logic conditions applied thereto, are of significance for the operation of the circuit arrangement shown in FIG. 2 since a signal Z emitted by circuit 32 initiates the release signal ZU, the absence of which causes counter 31 to operate and thus activates the processes controlled by its signals Z1 and Z2. In the present case, the abovementioned logic conditions must be adapted to the following circumstances for the emission of signal Z.

1. When no error is contained in the readout information present in information register 19, i.e., no signal F is emitted by error recognition device 27, signal Z is to be emitted.

2. The emission of signal Z under circumstance 1, above, is to occur only when no correction cycle is in progress, i.e., neither Z1 nor Z2 is present. Thus F has no effect during a correction cycle.

3. After completion of a correction, a signal Z and thus a release signal ZU, is to be emitted in any event. Signals Z1 and Z2 are present at that time.

4. If the operation signal "write in" is present at the input 24 of logic circuit 22, a release signal ZU is to be emitted in any event. Then signal S is present at the output of circuit 22 with the value associated with a writing-in operation.

5. The condition according to circumstance 4 must not become effective during a correction cycle. Z1 or Z2 is then present.

6. The condition for the emission of signal Z according to circumstances 1 to 5 are to become effective only during a clock pulse $T_3$.

The circuit 32 must thus satisfy the following logic relationship in order to fulfill the conditions according to circumstances 1 to 6:

$$Z=[(\bar{F}+S)\cdot(\overline{Z1+Z2})+Z1\cdot Z2]\cdot T_3$$

With respect to circumstance 4 it should be noted that this was presented in order to be able to consider the function of one memory by itself. It is also possible, with advantage, to monitor, by means of the error recognition device 27, the transmission channel connected to the data input 20 and to perform a correction process when an error is present in the information taken into information register 19, as was described in connection with FIG. 1. It is here advantageously possible to utilize the inversion device 16 for the second inversion. This requires substantially only one additional inversion device at the input of the transmission channel. Moreover, particular modifications of the logic relationships result for circuit 32 which permits a correction process to be performed when error-containing information has been transferred from inputs 20 into register 19.

The circuit arrangement shown in FIG. 2 operates in practically the same manner as known memories when writing in information as well as when reading out correct information. The following brief summarizing explanation will thus suffice.

The memory receives external instructions, e.g., from a computer, in the form of a start signal, an operation signal, an address and information to be written in. The signals as well as the address and the information are to remain available until the release signal given by the memory is present at terminal 34. This release signal serves as the check-back for the computer. It indicates the transfer of the information to be written in or read out into information register 19. Upon appearance of the release signal a new start and operation signal as well as a new address and possibly new information can be supplied by the computer. Each initiated storage cycle is completed independently thereof. At the end of the cycle the control mechanism emits an appropriate signal and this signal initiates a further cycle if a new start signal is present.

The start signal acts on the control mechanism which is shown in FIG. 2*a* and causes it to run through its operating sequence. The type of process initiated, readout or writing in, is determined by the nature of the operation signal OP present at terminal 24. In the present case, signal OP is not changed by the logic circuit 22. The output signal S of circuit 22 is applied to the control mechanism and to switch 18. When information is written in switch 18 is in the position shown in FIG. 2. During readout, switch 18 is operated to connect the outputs of the readout device 13 with the inputs of the information register 19.

After a start signal, the control mechanism immediately emits a signal $T_1$. This resets memory 33 and the release signal at output 34 disappears. Shortly thereafter a memory cell in memory unit 14 is addressed by the address information applied from the computer to control input 11. Then, during writing in, the information in the addressed memory cell is erased whereas during readout it is read out. During this time a clock pulse signal $T_2$ is also given by the control mechanism to effect transfer of the information present at the inputs 20 or at the output of readout device 13 into information register 19, member 23 being enabled since no signal is then present on counter output 35.

During readout, the information taken into register 19 is then checked by the error recognition device 27. If the information does not contain any errors, no signal F is emitted. Thus, neither signal F, nor the signal S corresponding to the operational mode of writing in, nor signals Z1 or Z2 appear at the inputs of logic circuit 32. If now a clock pulse signal $T_3$ is emitted by the control mechanism after signal $T_2$, the criteria for the emission of a signal Z is met. The memory 33 is set by this signal and the release signal ZU appears at output 34. This signal ZU maintains counter 31 in its zero position even if, after signal $T_3$, clock pulse signal $T_4$ is emitted by the control mechanism.

In the case of the operational mode "read out", the cycle is then completed since nondestructive reading was assumed. The signal for the end of the cycle is emitted by the control mechanism and a new cycle can follow.

In the operational mode "write-in", after the information is available in register 19, the control mechanism emits a signal through the control input 12 to write-in device 15 for writing this information into the addressed memory cell of memory unit 14. There then also follows the signal for the end of the cycle from the control mechanism and thus the release for permitting start of a new cycle.

In the case of an error in the information read out of memory unit 14, due to a faulty bit location in the addressed memory cell, the readout process continues in the manner described above until the error is detected by the error recognition device 27, the information in question then being present in register 19. At this time, the clock pulse signals $T_1$ and $T_2$ have already been produced. Since the readout cycle up to this point has already been described, it will not be repeated here.

If the next step is now the emission of clock pulse signal $T_3$, no signal 2 for setting memory 33 appears at the output of circuit 32 because an error signal F is present, i.e., $\bar{F}$ does not exist and S, $F_1$ and $F_2$ do not exist. Thus signal ZU which keeps counter 31 at zero also does not appear. The subsequent clock pulse signal $T_4$ can thus become effective so that a signal Z1 appears at output 35 of counter 31. This signal initiates the correction process for the faulty information, in that 1. the logic circuit 22 receives a signal Z1 and thus converts the signal at input 24 for the operational mode "read out" into a signal for the operational mode "write in";

2. a further transfer of information into register 19 is blocked by the application of Z1 to the negated input of member 23;

3. the member 25 produces an output to switch the inversion device 16 to its "invert" state; and 4. logic circuit 32 is blocked for signals S and F.

It should be further noted that, due to the absence of a release signal ZU at output 34, the start signal, the operation signal and the address remain unchanged. Thus, if after signal $T_4$ from the control mechanism, the signal for the end of the cycle appears, a write-in cycle is immediately initiated since the existence of Z1 caused circuit 22 to generate the signal "-write-in".

The write-in cycle continues with erasing and writing in as already described, but with the difference that, due to blockage by Z1, no information is read into register 19 from inputs 20 and no release signal Z is emitted by circuit 32. The complement of the information in register 19 is thus written into memory unit 14. The signal $T_4$ appearing at the end of this cycle advances the count in counter 31 so that signal Z1 disappears and signal Z2 appears. This results in the following condition:

1. Since Z1 is no longer present, a "readout" signal acting on the control mechanism again is present at the output of circuit 22;
2. The inversion device 17 is switched to its "invert" state by signal Z2;
3. Circuit 32 is blocked with respect to signals S and F by Z2, thus no signal Z and no release signal ZU can be emitted;
4. Switch 18 is operated by signal S to connect the inputs of register 19 to readout device 13;
5. Readout from register 19 is again enabled due to the elimination of Z1 from the negated input of member 23; and
6. Since no release signal has been emitted thus far; the start signal, the operation signal and the address continue to be present.

If now signal $T_4$ is followed by the signal for the end of the cycle from the control mechanism, an already described readout cycle is immediately initiated in which the inverted information contained in the memory block is again inverted and transferred into register 19. An error check on this information is prevented, however, by the existence of signal Z2. Thus, no release signal can be emitted as yet during this cycle although the corrected information is already present in register 19. This information is free of errors in the case where a single error of the above-described type had originally been present.

The clock pulse signal $T_4$ thus advances counter 31. Signals Z1 and Z2 are then present at outputs 35, 36. This results in the following switching states:

1. The operation signal "readout" which is still present at input 24 is again converted into the "write-in" signal by the application of Z1 to circuit 22;
2. Z1 blocks, via member 23, the transfer of new information into register 19.
3. Since Z2 is present, member 25 produces no signal and the inversion device 16 thus remains in its normal condition shown in FIG. 2;
4. Since Z1 and Z2 are both present, a signal Z for setting memory 33 is emitted in any case upon the occurrence of the next clock pulse $T_3$ in the following cycle independent of the values of signals F and S.

Due to the above-described switching state, the signal for the end of the cycle which appears after signal $T_4$ immediately actuates a write-in cycle again since the start signal, the operation signal as well as the address are still present. This write-in cycle writes the corrected information from register 19 into memory unit 14.

The cycle continues substantially as described above so that a repeated explanation is not deemed necessary. The only difference is the blocking by signal Z1 of the transfer of information into register 19 upon the occurrence of signal $T_2$ as well as the emission of a signal Z by circuit 32 at clock pulse $T_3$ due to the presence of signals Z1 and Z2. Signal Z sets memory 33 and thus resets counter 31 when memory 33 emits the release signal ZU. The information in register 19 can then be read out through outputs 21 and a new start signal, a new operation signal and a new address and new information to be written in can be provided. With the end of the current writing cycle the correction process is then completed.

This correction process accomplished the following:

The information readout from a memory cell, containing, e.g., bits B1, B2, B3 was recognized to be wrong. For example, B2 is assumed to be wrong. For the errors occurring in general operation this means that B2 was transmitted over a transmission path in which the output signal is independent of the input signal. The inverted signal $\overline{B2}$ is then correctly transmitted over this path. The location of the error in the erroneous data — here B2 — is accomplished in that the total information again passes over this transmission path after having been once inverted. The error thus again changes the respective bit. With the subsequent inversion the correct information is then obtained.

In summary, it thus results:

| | | | |
|---|---|---|---|
| B1 | B2 | B3 | correct information |
| B1 | $\overline{B2}$ | B3 | wrong information read out from memory unit **14** |

Correction process:

| | | | |
|---|---|---|---|
| $\overline{B1}$ | B2 | $\overline{B3}$ | first inversion at **16** |
| $\overline{B1}$ | $\overline{B2}$ | $\overline{B3}$ | after writing in and reading out from the same memory location, the error again changes B2 |
| B1 | B2 | B3 | second inversion at **17** and thus correct information |

Figure 3:
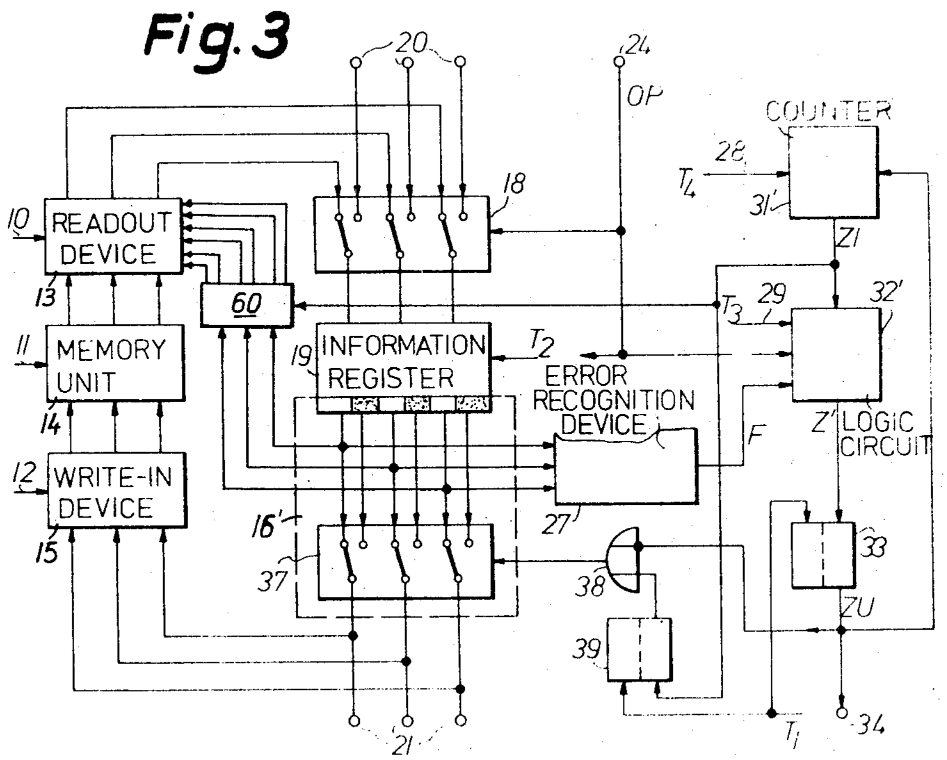
FIG. 3 is a diagram of a circuit arrangement having a memory for destructive reading with one-time circulation of the information but double utilization of an inverting device when errors are present, and a control device for switching the discrimination thresholds of the reading amplifiers.

FIG. 3 shows a circuit arrangement having a memory which is controlled by clock pulse signals for destructive readout and devices for performing a correction process which is performed when the readout information contains errors. This circuit differs from the circuit arrangement of FIG. 2 particularly in that a memory for a destructive readout and only one inversion device 16' are provided. The latter, however, is utilized twice during the correction process.

These differences require, firstly, a slight prolongation of the readout/rewrite cycle since the rewrite process must not start until after checking the readout information for the presence of an error and, secondly, a corresponding design of the devices for accomplishing the correction process. To make a correction only one additional readout/rewrite cycle is required, whereas in the circuit according to FIG. 2 two additional write-in cycles and one additional readout cycle were required. This results most of all in changes in the logic circuit and the counter.

Also, in the circuit arrangement according to FIG. 3, there is provided a control device 60 for switching the discrimination thresholds of the reading amplifiers in the readout device 13. The inputs of the control device 60 are connected to the non-negated outputs of the information register 19 as well as to the output of a counter 31'. The outputs of device 60 are connected to the reading amplifiers in device 13. The control device and its function will be discussed in detail in connection with FIGS. 5 to 7. It has no influence in the course of the correction process and rather serves to dependably achieve an error correction even for a signal wich lies in the vicinity of the discrimination threshold of a reading amplifier.

A memory unit 14 forms a ring circuit with an information register 19. Between the outputs of the memory unit 14 and the inputs of the register 19 a readout device 13 and a switch 18 are connected. The information register 19, which is controlled by a clock pulse $T_2$, has direct and complement outputs for each bit of the information, which outputs are connected with the corresponding inputs of a switch 37. Switch 37 together with the direct and complement outputs of the register 19 forms an inversion device 16.

The outputs of switch 37 are connected to information outputs 21 of the memory and to the inputs of the memory units 14 via a write-in device 15. The inputs of register 19 are also connected with information inputs 20 for the memory via switch 18. For each bit of the information to be written in or read out there is provided a respective transmission path. Switches 18 and 37 are generally composed of semiconductor elements.

The error checking device 27 is connected to the direct outputs of register 19 to furnish a signal F which activates one input of logic circuit 32'. Circuit 32' is controlled via another input 29 by a clock pulse $T_3$. Further inputs to circuit 32' receive an operation signal OP which is applied to input 24 and a signal Z1 emitted by counter 31'. The condition for the emission of a signal Z' at the output of circuit 32', and the criteria for its design, is as follows when expressed in logic terms:

$$Z' = (\bar{F} + Z1 + OP) \cdot T_3$$

This represents an OR condition controlled by clock pulse $T_3$ for signals $\bar{F}$ indicating that the information in register 19 does not contain any errors. Z1, indicating that an error correction has been accomplished, and OP, which is the operational mode "writein".

The input 24 is further connected with a control input of switch 18 as well as with a control mechanism (not shown) which furnishes the signals for controlling the storage cycles in a known manner.

The output of circuit 32' is connected with a memory 33 whose output is connected to an output terminal 34, an input of counter 31', and the negated input of an ORNOT member 38. Counter 31' is constituted by a bistable flip-flop. It is also provided with a further input 28 for clock pulses $T_4$. Its output is connected to the logic circuit 32', to control device 60 and, via a further memory 39, with the positive input of ORNOT member 38 whose output is connected to the control input of switch 37. Memories 33 and 39, which can also be constituted by bistable flip-flops, are also connected to receive a clock pulse $T_1$ which resets them.

The circuit arrangement shown in FIG. 3 operates as follows during readout of information containing an error:

A start signal, the operation signal "readout", and an address are fed to the memory from the outside, e.g., from a computer. The address and the signals are to be present at least until a release signal ZU appears at output 34. A memory cell whose information is to be released is addressed in a known manner by means of the address. Upon the appearance of the operational signal "readout", switch 18 remains in the illustrated position. No signal Z' for setting memory 33 can be initiated thereby. Together with the start signal operational signal "read out" sets the readout cycle in motion and thus the emission of a corresponding sequence of signals from the control mechanism.

The immediately emitted clock pulse signal $T_1$ resets memories 33 and 39 and the start signal, the operational signal and the address are taken into intermediary memories provided for this purpose, as is the usual practice. No release signal ZU is then present at output 34. As a result, member 38 produces an output signal which places switch 37 in the switching state opposite to that shown. Thereafter the information in the addressed memory cell is read out and transferred to information register 19. It is immediately checked for errors by the error recognition device 27.

If an error is present, a signal F is emitted by device 27. Since no signal Z1 or operational signal "write-in" is present, the clock pulse signal $T_3$ subsequently emitted by the control mechanism can not produce a signal Z' for setting memory 33, and thus no release signal ZU will appear. Switch 37 then also remains in the position opposite to that shown so that the information contained in register 19 is written into the selected memory cell in an inverted state during the subsequent rewriting process. Due to the absence of a release signal ZU, counter 31' is also advanced by a clock pulse signal $T_4$ emitted after clock pulse $T_3$. Signal Z1 thus appears to set memory 39. After emission of signal $T_4$, the control mechanism emits the signal for the end of the cycle.

Due to the absence of a release signal ZU at terminal 34, the start signal, operational signal and address continue to be present. Thus a new readout/re-write cycle — as described above — is immediately initiated during which the inverted information is read out again and transferred to register 19. At the occurrence of clock pulse $T_3$ of this cycle, signal Z', and thus the release signal ZU is emitted because a signal Z1 is present.

Subsequently, the information in register 19 is again inverted and rewritten into the addressed cell. Thus the original information is again present in the memory cell. The second inversion results from the switch 37 remaining in the position opposite to that shown under the control of the output signal from memory 39, which was set by Z1. The again inverted information, which is thus corrected for single errors as already discussed in connection with FIG. 2, is thus present at output terminals 21.

Release signal ZU at terminal 34 releases the information at outputs 21, by means not shown, for further use. The still present signals, i.e., the start and operational signal, as well as the address, are removed after the appearance of ZU, or are applied again. Moreover, counter 31' is reset by signal ZU so that its signal Z1 disappears. The clock pulse signal $T_4$ which follows $T_3$, however, can not switch on counter 31' because signal ZU remains present until the beginning of a new cycle. The signal for the end of the cycle which follows clock pulse signal $T_4$ completes this cycle and a new cycle can be started if the appropriate signals are delivered from the outside.

When reading out information not containing any errors, the cycle continues in the same manner as for information containing an error until the information is taken into register 19. This procedure has already been described above. Due to the absence of errors determined by the recognition device 27, this device now presents a signal $\bar{F}$ at its output. Thus a signal Z' setting memory 33 appears with clock pulse $T_3$ at the output of circuit 32' and produces the release signal ZU at output 34. This signal ZU holds counter 31' in its zero position during the later clock pulse $T_4$ and causes the output signal from member 38 to disappear so that switch 37 is switched back to the condition illustrated. The information contained in register 19 is thus present at output terminals 21. It is also rewritten into the addressed cell of memory unit 14. Signal ZU moreover effects the release of the information at output terminals 21.

The externally generated signals, i.e., the start and operational signal, as well as the address are now removed or reintroduced so that after the end of this cycle a new cycle can immediately begin if required. The current cycle is terminated after emission of clock pulse signal $T_4$ by the signal for the end of the cycle.

A writing-in cycle occurs in a manner corresponding to the above-described reading out of information without errors. In a known manner, instead of reading out the information of an addressed memory cell and transferring the same into information register 19, the information in the addressed memory cell is erased and the information present at the information inputs 20 is read into register 19 upon the occurrence of a clock pulse $T_2$.

Signal OP for the writing-in cycle replaces signal $\bar{F}$ from the error recognition device. The transmission channel connected to terminals 20 is thus not incorporated into the error recognition and correction process, in order to simplify the writing-in operation. Thus a release signal ZU is always emitted during a write-in cycle so that after transfer of new data to register 19 the further steps are the same as described above for a readout cycle.

Figure 4:
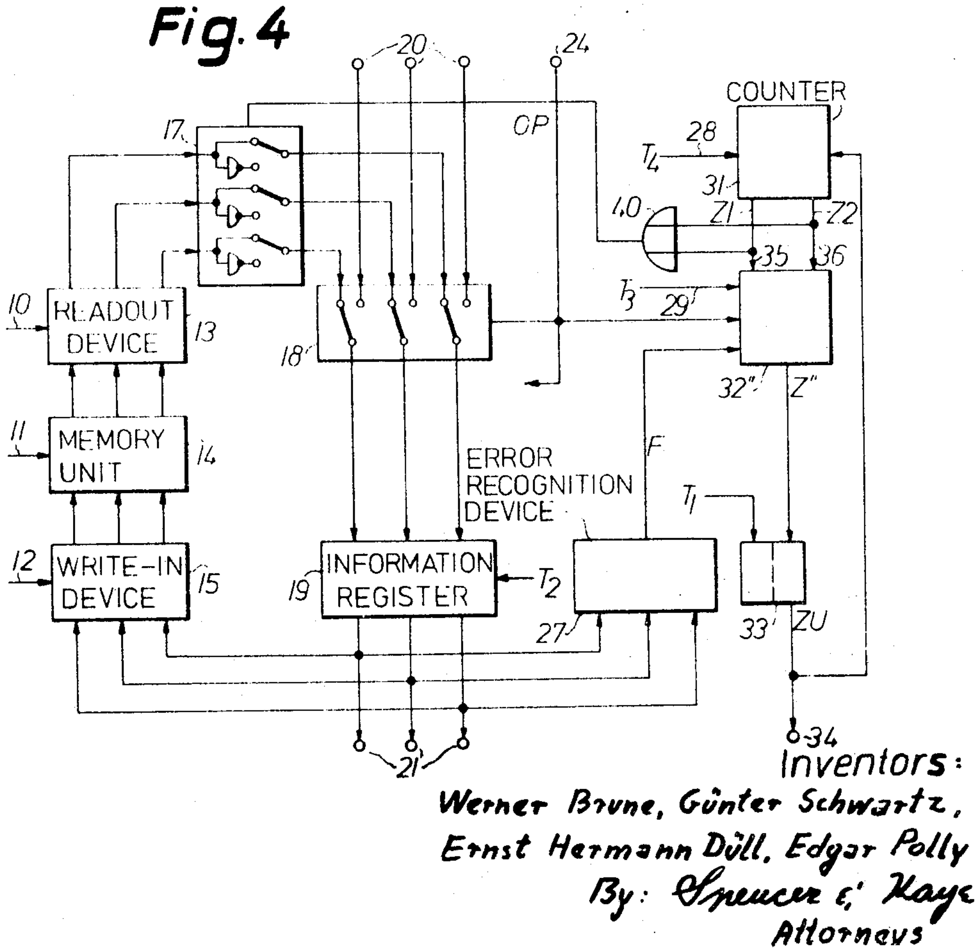
FIG. 4 is a diagram of a circuit arrangement having a memory for destructive reading and double circulation of the information when errors are present.

FIG. 4 also shows a circuit arrangement having a memory controlled by clock pulse signals for destructive reading in and control devices for performing a correction process. This circuit arrangement differs from that of FIG. 3 in that an inversion device 17 is disposed between readout device 13 and switch 18, the outputs of the information register 19 are connected directly to the information outputs 21 and the write-in device 15, and the control devices for performing the correction process are designed differently since the information passes twice through the ring circuit formed substantially of memory unit 14 and register 19 during a correction process. In the case of an error, two additional readout/rewrite cycles must be performed, with an inversion after each readout.

The following description of the design of the circuit arrangement of FIG. 4 can thus be limited to a description of the control devices for the correction process. Aside from the above-mentioned differences, its structure and operation have already been described in connection with FIG. 3.

The error recognition device 27 is connected to the outputs of register 19. Its output furnishes a signal F which is applied to an input of logic circuit 32'' controlled by clock pulses $T_3$ via an input 29. An operational signal OP present at input 24 and signals Z1 and Z2 are applied to circuit 32'', each via a respective further one of its inputs. The condition for the emission of a signal Z'' at the output of circuit 32'', and thus the design criterion of the circuit, is as follows, when expressed in logic terms:

$$Z'' = [(\bar{F} \cdot \overline{Z1}) + OP + Z2] \cdot T3$$

This represents substantially an OR condition controlled by clock pulse $T_3$, for signals F, indicating that the information in register 19 is without errors, this condition being cancelled during a correction process when signal Z1 is present, Z2 indicating that the error correction is accomplished, and OP, the operational mode "write-in" signal.

The input 24 is further connected to a control input of switch 18 as well as the control mechanism (not shown) from which the signals, particularly clock pulse signals $T_1$ to $T_4$, for controlling a memory cycle are furnished.

The output of circuit 32'' is connected to a memory 33 which can be reset by a clock pulse signal $T_1$ and which emits an output signal ZU. The output of memory 33 is connected to a release output 34 as well as to the reset input of a two-stage counter 31 which counts clock signals $T_4$ present at a further input 28 when no signal ZU from memory 33 is present. Counter 31 has two outputs 34 and 36 which are connected to inputs of logic circuit 32'' and to the inputs of an OR member 40 whose inputs is connected to a control input of inversion device 17.

The circuit arrangement shown in FIG. 4 operates as follows when reading out information without errors:

The start signal, the operational "readout" and an address are delivered to the memory from the outside. With the appearance of the operational "readout" signal, the switch 18 is in the illustrated position. The readout/re-write cycle otherwise continues practically in the same manner as for the circuit arrangement of FIG. 3 so that reference can be made to the description presented above in connection therewith. The only difference is that in the circuit arrangement of FIG. 4 the rewrite process is performed without waiting for the results of the error recognition process. When operating in the absence of errors there thus results no increase in the cycle time when compared with memories which do not effect error recognition and correction of the read out information.

A signal $\bar{F}$ produced by the error recognition device 27 for information which was read into register without errors, however, has the same effect as in the circuit arrangement according to FIG. 3. Upon the occurrence of the clock pulse $T_3$, signal Z'' is accordingly emitted by circuit 32'', and thus producing the release signal ZU by memory 33. The effects of signal ZU on the course of the readout/re-write cycle and on counter 31 also correspond to those in the circuit arrangement according to FIG. 3.

However, if the information read out of an addressed memory cell contains an error, the readout/re-write cycle still continues in substantially the same manner as when the read out information contains no errors. Particularly, the information containing an error is rewritten into the addressed memory cell since the re-writing occurs without waiting for the results of the error check.

But in this case the error recognition device 27 emits a signal F.

Thus, upon the occurrence of clock pulse signal $T_3$, no signal Z'' for setting memory 33 appears at the output of the logic circuit 32'' and no release signal ZU is produced. The externally derived signals, i.e., the start and operational signal, as well as the address can then not be removed and remain present. Moreover, clock pulse $T_4$ of this cycle advances counter 31 since no release signal ZU is present to maintain counter 31 in its reset state. A signal Z1 appears at the output 35 of counter 31 and actuates OR member 40 to switch the inversion device 17 to its "invert" state. In addition, the presence of Z1 nullifies the ability of a signal $\bar{F}$ from error recognition device 27 to influence circuit 32''.

The signal for the end of the cycle emitted by the control mechanism after clock pulse signal $T_4$ immediately initiates a new readout/re-write cycle which continues as already discussed. The emission of a signal Z'', and accordingly of a signal ZU, is prevented by the presence of Z1. Counter 31 is advanced by clock pulse $T_4$ of the new cycle so that signal Z2 appears at its output 36. This signal maintains, through member 40, the inversion device 17 in its "invert" state and places the logic circuit 32'' in a condition for producing a signal of Z'' upon the occurrence of clock pulse signal $T_3$ of the next succeeding cycle.

After the end of the current cycle, a new readout/re-write cycle begins immediately in which the information contained in the addressed memory cell is again inverted, transferred into information register 19 and again written into the memory cell. The corrected and, if a single error were present, error-free information is then present in register 19. Due to the presence of signal Z2, a signal Z'', and therefore the release signal ZU, are produced in any case during this cycle upon the occurrence of clock pulse signal $T_3$. This resets counter 31 so that no signals Z1 or Z2 will be present at its outputs 35 and 36. The information present at terminals 21 can then be taken off and new signals for starting and mode of operation and a new address can be applied.

It has already been stated above that a data word can also contain errors in which the value of the signal representing the binary state of a bit lies in the vicinity of a discrimination threshold which distinguishes the binary values "0" and "L". Fluctuations of this value around the discrimination threshold can thus have an adverse influence which can be avoided, however, if the discrimination threshold is shifted during a correction process in such a manner that the fluctuations become ineffective. Accordingly, the discrimination threshold is either raised or lowered depending on the readout signal by means of a control device, which is the control device referred to in the earlier description of FIG. 3.

Figures 5, 6:
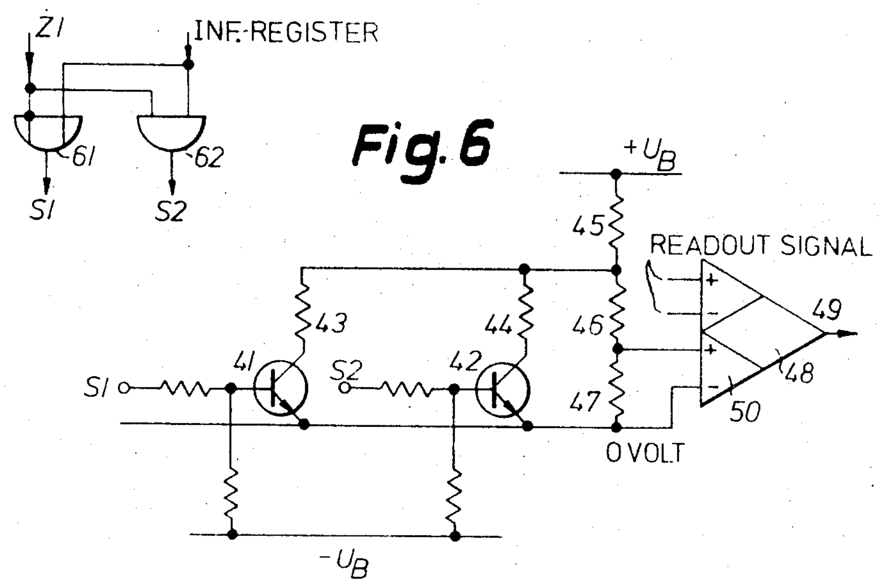
FIG. 5 is a diagram of a logic circuit for producing control signals.
FIG. 6 is a diagram of a circuit arrangement for switching the discrimination threshold of a reading amplifier.

The control device has a respective logic circuit as shown in FIG. 5 for each bit of the information word to be corrected. This circuit consists of an ORNOT member 61 with a negated input and an AND member 62. The output of counter 31' of the circuit of FIG. 3 is connected to the negated input of the ORNOT member 61 and to one input of AND member 62. The second inputs of ORNOT member 31 and AND member 62 are connected to the direct output for the respective bit of information register 19. The output signal of ORNOT member 61 is marked S1 and that of AND member 62 is marked S2.

During normal operation, i.e., with no error correction and no signal Z1 appearing, the signal S1 is always present and the signal S2 is not present. During error correction, however, when a signal Z1 is present, both signals S1 and S2 are absent if the respective bit in the information register is "0" and both signals S1 and S2 are present if this bit is "L".

Signals S1 and S2 generated for each bit of an information word are fed, for example, to a reading amplifier circuit of one bit path of the readout device 13 of FIG. 3. FIG. 6 shows a circuit arrangement for switching the discrimination threshold of a reading amplifier 48.

The signals S1 and S2 are fed to the bases of respective transistors 41 and 42 through voltage dividers connected to a bias source having a transistor blocking effect. The collectors of the transistors 41 and 42, acting as switching elements, are connected through 43 and 44, respectively, to a voltage divider formed by resistors 45, 46, and 47 connected between reference potential and the positive pole of the operating voltage. The connection is here made at the connection point between resistors 45 and 46.

The reading amplifier 48; e.g., Texas Instruments reading amplifier Model No. S. N. 7520 N, comprises a reference amplifier 50 and a further amplifier. The readout signal is fed to the further amplifier. The reference amplifier 50 permits changing of the actuation threshold for positive and negative readout signals. For this purpose the negative input of the reference amplifier 50 is at reference potential, whereas the positive input is connected to the connection point of resistors 46 and 47.

The operation is as follows:

During normal operation, when no correction process takes place signal S1 is present and signal S2 is absent. Accordingly, transistor 41 is conductive and transistor 42 is blocked. Thus, resistor 43 is in parallel with resistors 46 and 47. The reference signal is then at a center value.

If, however, a correction process is taking places and an L signal is present in the associated bit of the information register 19, this can mean, for a signal containing an error, that it was only somewhat above the discrimination threshold. Since a signal containing an error can fluctuate somewhat, the discrimination threshold is preferably lowered to assure the readout of an "L" during the transmission of the inverted information.

Because of the presence of the L signal at the beginning of the correction process in the associated bit of information register 19, and because of the signal Z1 present during the correction process, signals S1 and S2 are produced by the logic circuit of FIG. 5. Both transistors 41 and 42 are then conductive and both resistors 43 and 44 are in parallel with resistors 46 and 47, so that the reference voltage, and thus the discrimination threshold, is reduced.

Raising of the discrimination threshold for the presence of an 0 signal in the associated bit of information register 19 by blocking both transistors 41 and 42 occurs in the corresponding manner.

Instead of the above-described change in the discrimination threshold, the effects of fluctuations in the value of the signal around the discrimination threshold can also be avoided by appropriate changes in the physical parameter producing the signal, e.g., the excitation current in a core matrix. This will be explained with the aid of FIG. 7. The control device, with logic circuits according to FIG. 5 and signals S1 and S2 emitted thereby, remain unchanged. However, the device now acts on the excitation current circuits of the write-in device 15 associated with each bit of a word, which circuits are also used for reading out the information.

Figure 7:
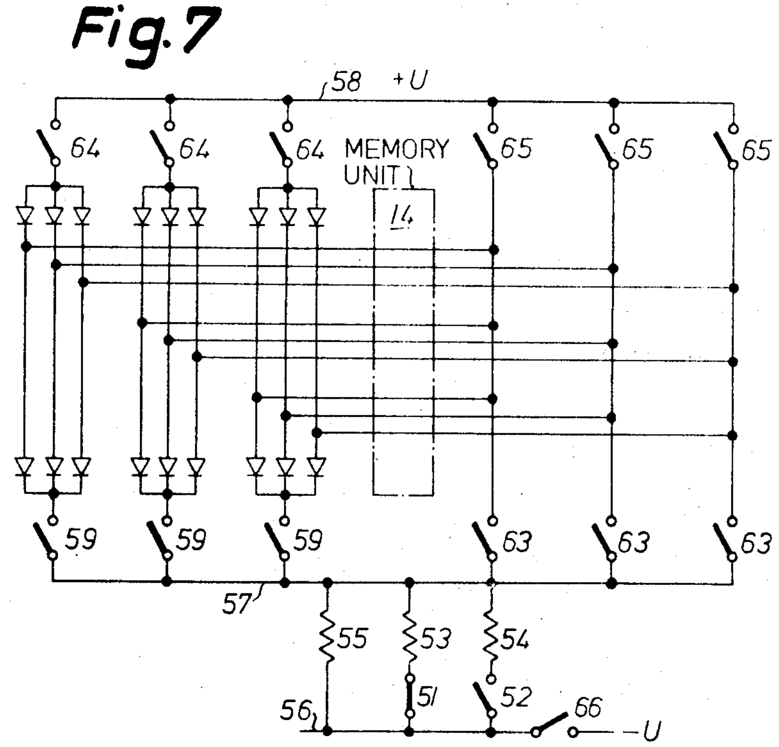
FIG. 7 is a diagram of an excitation current circuit for core memories according to the 2 ½ D principle.

FIG. 7 shows a known excitation current circuit for core matrixes according to the 2 ½ D principle in simplified form. This circuit is provided for each bit of a word. Word wires are not shown for reasons of clarity. The selection, and thus the control, of the desired core in memory unit 14 is accomplished by closing one each of switches 63 and 64 or 59 and 65, respectively, depending on the respective address. A voltage is then applied to lines 56, 57 and 58 and switch 66 is closed. This applies for writing in an "L" signal or for reading out. When writing in an "0" signal, switch 66 remains open. The value of the excitation current is determined essentially by a resistor 55 connected between lines 56 and 57.

Parallel to this resistor two series circuits each consisting of a resistor 53 and 54, respectively and a switch element 51 or 52, respectively, are connected. Switch elements 51 and 52 are electronic switches, as are switches 59, 63, 64 and 65. Switch element 51 is controlled by signal S1, and switch element 52 by signal S2. When signals S1 and S2, respectively, are present, switch elements 51 or 52, respectively, are closed.

During normal operation, switch element 51 is closed. If switch elements 51 and 52 are both closed, the excitation current becomes greater. The read-out signal is then correspondingly larger. This corresponds to a relative lowering of the discrimination threshold of the reading amplifier. If both switch elements 51 and 52 are open, the opposite situation results. The coaction with the control device during a correction process corresponds to the behavior discussed above in connection with FIG. 6. A renewed discussion is therefore not considered necessary.

The above-mentioned changes in the discrimination threshold or in the excitation current are so adjusted that the possible fluctuations of an error can have no effect and the limit values associated with the two information values "0" and "L" for the physical value for error-free signals are not exceeded. Normally the discrimination threshold is midway between the two limit values.

The changes in the discrimination threshold discussed above in connection with FIG. 3 or the changes in an associated value can also be provided in the circuit arrangements according to FIGS. 1, 2 and 4. In the circuit according to FIG. 1 appropriate memory devices are connected to switch 9 which appropriately change, for example, the discrimination threshold of amplifiers at the output of the transmission channel 4. In the circuit arrangement of FIG. 2 there is only one change with respect to that of FIG. 3, i.e., that signal Z2 takes the place of signal Z1. The arrangement of the control device remains unchanged. In the circuit according to FIG. 4 the control device must be arranged to act on the reading amplifier. The logic circuits according to FIG. 5 in this case receive, during the first cycle of the information processing, signal Z1 and the direct outputs of information register 19 and, during the second cycle, signal Z2 and the complement output signals of information register 19.

It is further possible to simplify the circuit shown in FIGS. 6 and 7 if the only errors which occur are those which alway lead to smaller signals. This is the case, for example, with damaged cores in a core memory. In this case the discrimination threshold need be changed only in one direction, i.e., raised in the present case. The inverse applies for errors which lead only to larger signals.

The advantages realized by the present invention consist in particular in that simple methods and circuit arrangements permit the correction of errors in data words without requiring preliminary location of the error as long as a single error is present and the information is transmitted in parallel. The information need contain only one additional bit so that an error check, particularly a parity check, can be performed.

One aspect of the invention which leads to a certain degree of flexibility in its practical applications is that, to correct errors caused by faults in a transmission path, it makes no difference whether the first inversion and retransmission is performed on the original, error-free word stored at the input end of the channel or on the transmitted word into which the error has already been introduced. In either case, the effect of the faulty transmission path will be to cause the value of the retransmitted erroneous bit arriving at the output of the channel to be the complement of the correct value of that bit, while the first inversion will assure that the value of all retransmitted correct bits will be the complement of their correct value.

It will be understood that the above description of the present invention is susceptible to various modifications, changes and adaptations, and the same are intended to be comprehended within the meaning and range of equivalents of the appended claims.

We claim:

1. A method for correcting errors which appear in binary data words when their bits are transmitted in parallel in a normal transmission direction over a transmission channel having one transmission path for each word bit, comprising the steps of:

testing each transmitted word for the existence, due to a faulty transmission path, of an erroneous bit at the output of the channel;

inverting each bit of a word found to contain an erroneous bit;

transmitting the inverted bits over their respective transmission paths of the transmission channel in the normal transmission direction; and re-inverting the transmitted inverted bits to arrive at the correct word.

2. A method as defined in claim 1 comprising the preliminary step of storing each originally transmitted word at the input of the channel and wherein said steps of inverting and transmitting are performed on the word stored at the input of the channel.

3. A method as defined in claim 1 wherein the transmission channel is a parallel read-in, parallel readout memory connected to read data words out to an information register and to read data words in from the register, and said step of testing is carried out after a word has been read out to the register and while the word is in the register.

4. A method as defined in claim 3 wherein said step of inverting is carried out as the word is read out from the register, said step of transmitting is carried out by reading the inverted bits into the memory, and said step of re-inverting is carried out as the inverted bits are read out of the memory back into the register.

5. A method as defined in claim 3 wherein said step of inverting is carried out while again reading the word out from the memory to the register, said step of transmitting is carried out by reading the inverted bits from the register into the memory, and said step of re-inverting is carried out while reading the inverted bits from the memory into the register.

6. A method as defined in claim 3 wherein said step of inverting is carried out while reading the word out of the register, said step of transmitting is carried out by reading the inverted bits into the memory and subsequently reading those bits out of the memory and back into the register, and said step of re-inverting is carried out while reading the inverted bits out of the register to an external device.

7. A method as defined in claim 1 wherein each word bit is represented by an electrical signal whose value is above a discrimination threshold for one binary bit state and below the threshold for the opposite binary bit state and comprising the further step of, during said transmitting step, lowering the dircrimination threshold of each bit which, at the time of said testing step, had said one binary state, and raising the discrimination threshold of each bit which, at the time of said testing step, had said opposite binary state.

8. A method as defined in claim 1 wherein each word bit is represented by an electrical signal whose value is above a discrimination threshold for one binary bit state and below the threshold for the opposite binary bit state and comprising the further step of, during said transmitting step, raising the electrical signal value of each bit which, at the time of said testing step, had said one binary state, and lowering the electrical signal value of each bit which, at the time of said testing step, had said opposite binary state.

9. Apparatus for correcting errors which appear in binary data words when their bits are transmitted in parallel over a transmission channel having one transmission path for each word bit and which are due to a fault in one transmission path, comprising, in combination:

a memory containing data words to be transmitted and arranged to read out the bits of such word in parallel;

error recognition means connected to the output of the channel for producing an error signal upon receipt, from the channel, of a word containing an error;

first parallel switch means connected between said memory and the inputs of the channel for delivering the bits of a word stored in said memory in parallel to the channel paths;

bit inversion means connected to the output of the channel for inverting each bit of a word appearing at the channel output; and second parallel switch means having output terminals and signal inputs connected to the channel outputs and to the outputs of said inversion means, said second switch means also having a control input connected to the output of said error recognition means for controlling the operation of said second switch means for placing said second switch means in a first state in which the channel outputs are connected to said output terminals when no error signal is produced by said error recognition means and in a second state in which said inversion means outputs are connected to said output terminals when an error signal is produced by said error recognition means.

10. An arrangement as defined in claim 9 further comprising second bit inversion means connected between said memory and said first switch means for inverting each bit of a word read out of said memory, and wherein said first switch means has a control input connected to the output of said error recognition means for placing said first switch means in a first state in which said memory is connected directly to the inputs of the channel when no error signal is produced by said error correction means, and a second state in which said second bit inversion means is connected in series between said memory and the inputs of the channel when an error signal is produced by said error recognition means.

11. Apparatus for correcting errors which appear in binary data words when their bits are transmitted in parallel over a transmission channel having one transmission path for each word bit and which are due to a fault in one transmission path, comprising, in combination:

a memory unit having a plurality of addressable data word storage locations and arranged for the parallel read-in and readout of a data word at each location, a selected storage location of said unit constituting the transmission channel;

a data word register connected for parallel read-in and readout of data words;

first parallel switch means selectively connecting the inputs of said register to the outputs of said memory or to external data word input terminals;

read-in means connecting the outputs of said register to the inputs of said memory unit;

switchable bit inversion means connected in series between said memory unit and said register and switchable between a first state in which it permits the passage of a word with its bits unaltered and a second state in which it inverts each bit of a word passing therethrough, error recognition means connected to the output of said register for producing an error signal at its output upon the appearance of a data word containing an error in said register;

logic circuit means having an input connected to the output of said error recognition means and responsive to the signal at its input to be switchable between a first state in which it normally produces an output signal when no error signal is being produced by said error recognition means, and a second state in which it produces no output signal when an error signal is being produced by said error recognition means;

temporary storage means connected to store the output signal produced by said logic circuit means;

means providing a succession of periodic signal pulses including, in order, first, second and third signal pulses; and counter means having one input connected to said temporary storage means, a second input connected to receive such periodic signal pulses, and an output at which a count signal appears when a signal pulse is applied to its said second input and no signal is being stored by said storage means, the output of said counter means being connected to said logic circuit means and to a control input of said bit inversion means for placing said bit inversion means in its second state when a count signal appears at said counter means output.

12. An arrangement as defined in claim 11 wherein:

there are two of said bit inversion means one of which is connected in series between the output of said register and the input of said memory unit and the other of which is connected in series between the output of said memory unit and the input of said register; and said counter has a first output and a second output both connected to said logic circuit means and is arranged for producing, when no signal is stored by said storage means, a count signal at only said first output when such first signal pulse is applied to its said second input, a count signal at only said second output when such second signal pulse is applied to its said second input, and a count signal at both of said outputs when such third signal pulse is applied to its said second input, said second output being connected to the control input of said other of said bit inversion means for placing that bit inversion means in its second state only when a count signal appears at said second output; and said arrangement further comprises:

a first ANDNOT member having a direct input connected to said first output of said counter means, a negated input connected to said second output of said counter means, and an output connected to the control input of said one bit of said bit inversion means for placing that bit inversion means in its said second state when a signal appears at said output of said first ANDNOT member;

a second ANDNOT member having a direct input connected to receive a periodic pulse before each periodic signal pulse received by said counter means second input, a negated input connected to said first output of said counter, and an output connected to a control input of said register for causing the contents of said register to be read out when a signal appears at said output of said second ANDNOT member; and second logic circuit means connected to control the read-in and readout modes of said memory unit and having a control input connected to said first output of said counter for changing the reading mode of said memory unit upon the appearance of a count signal at said first output of said counter means.

13. An arrangement as defined in claim 11 wherein:

said bit inversion means is connected in series between the output of said memory unit and the input of said register; and said counter has a first output and a second output both connected to said logic circuit means and is arranged for producing, when no signal is stored by said storage means, a count signal at only said first output when such first signal pulse is applied to its said second input, a count signal at only said second output when such second signal pulse is applied to its said second input, and a count signal at both of said outputs when such third signal pulse is applied to its said second input;

and said arrangement further comprises an OR member having two inputs each connected to a respective one of said outputs of said counter means and an output connected to the control input of said bit inversion means for placing said bit inversion means in its second state when a count signal appears at either output of said counter means.

14. An arrangement as defined in claim 11 wherein said bit inversion means is connected in series between the output of said register and the input of said memory, and said arrangement further comprises:

second temporary storage means connected to said counter means output to store the count signal appearing thereat;

an ORNOT member having a direct input connected to said second temporary storage means, a negated input connected to said first-recited temporary storage means, and an output connected to the control input of said bit inversion means for placing said bit inversion means in its second state when a signal appears at said output of said ORNOT member; and a reset line connected to both of said temporary storage means for applying a reset pulse thereto for erasing their contents prior to each periodic signal pulse applied to said second input of said counter means.

15. An arrangement as defined in claim 11 further comprising;

a readout device connected to the output of said memory unit and composed of a plurality of threshold amplifiers each connected in one transmission path of said memory unit output for producing a word bit having one binary state when it receives an electrical signal whose value is above a discrimination threshold and a word bit having the opposite binary state when it receives an electrical signal whose value is below that discrimination threshold; and adjusting means connected to be controlled by said error recognition means for increasing the difference between the electrical signal and the threshold associated with each transmission path.

16. An arrangement as defined in claim 15 wherein said adjusting means are connected to the output of said register for increasing such difference in accordance with the value of the bits stored in said register.

17. An arrangement as defined in claim 16 wherein said adjusting means comprises for each transmission path:

a control device connected to the output of said error recognition means and to the associated bit output of said register, and having two outputs; two switching elements each connected to a respective output of said control device to have its switching state controlled by the signal appearing at such output; a voltage divider having its output connected to the associated threshold amplifier for applying a voltage which determines the amplifier threshold value; and two resistors each connected to a respective switching element, each said element and its associated resistor forming a series arrangement connected across said voltage divider.

18. An arrangement as defined in claim 16 wherein the amplitude of each bit-representing electrical signal produced by said memory unit during readout is determined by the value of the excitation current applied to an associated bit storage element, and said adjusting means comprises, for each transmission path: two switch elements connected to be controlled by the output of said error recognition device and the associated bit output of said register; two resistors each connected in series with a respective switch element in the excitation current path of the associated bit storage element; and a further resistor connected in parallel with the series branches composed of said switch elements and their associated resistors.

* * * * *